(12) United States Patent
Feng et al.

(10) Patent No.: US 11,572,963 B2
(45) Date of Patent: Feb. 7, 2023

(54) PNEUMATIC-HYDRAULIC CONTROL VALVE

(71) Applicant: J.D COMPONENTS CO., LTD., Chang Hua Hsien (TW)

(72) Inventors: Pin-Chieh Feng, Chang Hua Hsien (TW); Nien-Teng Kuo, Chang Hua Hsien (TW); Yu-An Lin, Chang Hua Hsien (TW)

(73) Assignee: J.D COMPONENTS CO., LTD., Chang Hua Hsien (TW)

( * ) Notice: Subject to any disclaimer, the term of this patent is extended or adjusted under 35 U.S.C. 154(b) by 0 days.

(21) Appl. No.: 17/519,180

(22) Filed: Nov. 4, 2021

(65) Prior Publication Data
US 2022/0170565 A1 Jun. 2, 2022

(30) Foreign Application Priority Data
Nov. 27, 2020 (TW) .................. 109215700

(51) Int. Cl.
| | | |
|---|---|---|
| *F16K 31/122* | (2006.01) | |
| *F16K 1/54* | (2006.01) | |
| *F15B 11/072* | (2006.01) | |
| *F16K 1/36* | (2006.01) | |
| *B62J 1/08* | (2006.01) | |

(52) U.S. Cl.
CPC ........ *F16K 31/1226* (2013.01); *F15B 11/072* (2013.01); *F16K 1/36* (2013.01); *F16K 1/54* (2013.01); *F16K 31/1223* (2013.01); *B62J 2001/085* (2013.01)

(58) Field of Classification Search
CPC .... F16K 31/1226; F16K 31/1223; F16K 1/36; F16K 1/54; B62J 2001/085; F15B 11/072
See application file for complete search history.

(56) References Cited

U.S. PATENT DOCUMENTS

| | | | |
|---|---|---|---|
| 2015/0300382 A1* | 10/2015 | Kuo .......................... | B62J 1/06 91/45 |
| 2017/0043832 A1* | 2/2017 | Tsai ........................ | B62K 19/36 |
| 2017/0341692 A1* | 11/2017 | Shirai ..................... | B62K 19/36 |
| 2018/0244330 A1* | 8/2018 | Shirai ........................ | B62J 1/08 |

(Continued)

FOREIGN PATENT DOCUMENTS

| | | |
|---|---|---|
| TW | M513253 U | 12/2015 |
| TW | I674213 B | 10/2019 |

*Primary Examiner* — Patrick C Williams
(74) *Attorney, Agent, or Firm* — Muncy, Geissler, Olds & Lowe, P.C.

(57) ABSTRACT

A pneumatic-hydraulic control valve includes a valve base and a valve stem movably disposed in the valve base. A first inner oil guiding hole of the valve stem communicates with a first outer oil guiding hole of the valve base. A second inner oil guiding hole of the valve stem does not communicate with a second outer oil guiding hole of the valve base when the valve stem is closed, and communicates with the second outer oil guiding hole of the valve base when the valve stem is opened. Further, the valve stem has a first stressed portion for bearing a fluid closing force and a second stressed portion for bearing a fluid opening force. The outer diameter of the first stressed portion is larger than that of the second stressed portion. Thus, the present invention reduces a valve opening force without affecting the sealing effect.

6 Claims, 22 Drawing Sheets

(56) References Cited

U.S. PATENT DOCUMENTS

2019/0071146 A1* 3/2019 Shirai .................... B62K 23/06
2019/0301497 A1* 10/2019 Jordan ................. F15B 15/227
2019/0351966 A1* 11/2019 Shirai ...................... B62J 50/20

* cited by examiner

PNEUMATIC-HYDRAULIC CONTROL VALVE

BACKGROUND OF THE INVENTION

1. Field of the Invention

The present invention relates to valves and more particularly, to a pneumatic-hydraulic control valve that can reduce a valve opening force without affecting its sealing effect.

2. Description of the Related Art

Generally, a conventional pneumatic-hydraulic seat tube assembly uses the compressibility of air to match the flow of hydraulic oil in the space to cause a change in relative position between the seat tube and the seat post, thereby achieving the effect of adjusting the height of the saddle.

TW Patent No. 1674213 discloses an isolator configured between a first pressure chamber and a second pressure chamber and disposed along the flow path of the fluid. The fluid pressure in the first pressure chamber has a net force of equal to or near zero on the isolator, such that the hydraulic force required to close the valve will not be increased with the weight of a rider. Therefore, a mechanism with less valve opening force (such as a motor) can be provided. By this way, when the rider is not seated on the saddle, the fluid pressure in the second pressure chamber is greater than the fluid pressure in the first pressure chamber. At this time, if the electronics module is operated to open the valve, the isolator is opened to allow the fluid to flow from the second pressure chamber to the first pressure chamber, such that the upper tube will be raised. When the electronics module is operated to close the valve, the fluid pressure in the second pressure chamber will force the isolator to be closed. The upper tube will remain in the vertical height position at the instant the valve closed. On the contrary, when the rider is seated on the saddle, the fluid in the first pressure chamber is pressurized by the rider's weight to exceed the fluid pressure in the second pressure chamber. By operating the electronics module to open the valve, the isolator is opened to allow the fluid to flow from the first pressure chamber to the second pressure chamber, such that the upper tube will be lowered. When the electronics module is operated to close the valve, the balance of forces will force the isolator to be closed. The upper tube will thus remain in the vertical position attained at the instant the valve closed. However, in the aforesaid prior art, the fluid opening force and the fluid closing force are equivalent and have opposite direction, i.e., the resultant force acting on isolator is close to or equal to zero. Thus, the fluid closing force acting on the isolator may be insufficient to cause a problem of an insufficient sealing effect.

TW Patent No. M513153 discloses a piston pin disposed in the fixed piston to control the communication relationship between the first oil chamber and the second oil chamber. When a rider is not seated on the saddle, the actuating shaft is driven by the cable to push the piston pin so that the first oil chamber and the second oil chamber communicate with each other. At this time, the air pressure in the inner and outer air chambers will push the hydraulic oil through the floating piston to allow the hydraulic oil to flow from the second oil chamber to the first oil chamber, thereby applying an upward force to the seat tube. The seat tube will thus start to be raised automatically. When the rider stops operating the control unit, the piston pin will return to its original position by the elastic force of the return spring so that the first oil chamber and the second oil chamber do not communicate with each other. At this time, the seat tube stops raising. On the contrary, when the rider is seated on the saddle and operates the control unit to drive the actuating shaft to push the piston pin, the seat post starts will start to be lowered. At this time, the hydraulic oil flows from the first oil chamber to the second oil chamber and pushes the floating piston downwards, so that the air flows from the inner air chamber to the outer air chamber. When the rider stops operating the control unit, the piston pin will return to its original position by the elastic force of the return spring, so that the first oil chamber and the second oil chamber do not communicate with each other. The seat tube will thus stop lowering. However, in the aforesaid prior art, the fluid closing force is greater than the fluid opening force, and the fluid closing force will be increased with the weight of the rider. Therefore, a mechanism with less valve opening force (such as a motor) can't be used to open the piston pin, but a mechanism with greater fluid opening force (such as the aforesaid control unit) only can be configured to open the piston pin.

SUMMARY OF THE INVENTION

It is a primary objective of the present invention to provide a pneumatic-hydraulic control valve, which can reduce a valve opening force without affecting its sealing effect.

To attain the above objective, the pneumatic-hydraulic control valve of the present invention comprises a valve base and a valve stem. The valve base has a valve hole, a first outer oil guiding hole radially communicating with the valve hole, and a second outer oil guiding hole radially communicating with the valve hole. The valve stem is movably disposed in the valve base and provided with a first inner oil guiding hole, a second inner oil guiding hole, and an inner oil guiding groove communicating with the first inner oil guiding hole and the second inner oil guiding hole. The first inner oil guiding hole of the valve stem communicates with the first outer oil guiding hole of the valve base. When the valve stem is closed, the second inner oil guiding hole of the valve stem and the second outer oil guiding hole of the valve base do not communicate with each other. When the valve stem is opened, an oil guiding channel is formed between the valve base and valve stem, and communicates with the second inner oil guiding hole of the valve stem and the second outer oil guiding hole of the valve base. Further, the valve stem has a first stressed portion adjacent to the first inner oil guiding hole and a second stressed portion adjacent to the second inner oil guiding hole. The first stressed portion is used for bearing a fluid closing force, and the second stressed portion is used for bearing a fluid opening force. The outer diameter of the first stressed portion is larger than the outer diameter of the second stressed portion.

It can be understood from the above illustration that the pneumatic-hydraulic control valve of the present invention utilizes the difference in the outer diameter between the first stressed portion and the second stressed portion to enable the fluid closing force to be slightly larger than the fluid opening force when the valve stem is closed, thereby ensuring the sealing effect of the valve stem. When the weight of a rider is added to the valve stem, the fluid closing force is slightly increased but not much, so the force required to open the valve stem is not limited by the weight of the rider. Therefore, a mechanism with less valve opening force (such as a motor) can be configured to the valve stem, such that the pneumatic-hydraulic control valve of the present invention can be applied to various types of the pneumatic-hydraulic actuating device (such as a lifting seat tube or a front fork).

Preferably, one end of the valve base has an opening axially communicating with the valve hole. The distance between the first outer oil guiding hole and the opening is less than the distance between the second outer oil guiding hole and the opening.

Preferably, a valve driving mechanism is installed in the opening for driving the valve stem to move between the close position and the open position.

Preferably, the valve stem includes a first stem member and a second stem member. The first stem member has the first inner oil guiding hole. One end of the first stem member is abutted with the opening of the valve base, and the other end of the first stem member has the first stressed portion. The second stem member has the inner oil guiding groove. One end of the second stem member is threaded with the first stressed portion of the first stem member, and the other end of the second stem member has the second inner oil guiding hole and the second stressed portion. When the valve stem is located at the open position, the oil guiding channel is formed between the second stem member of the valve stem and the valve base. By using the two-piece structural design of the valve stem, the convenience of assembly is enhanced.

Preferably, the valve base includes a base body, a limiting ring, and an end cap. The base body has the opening and the first outer oil guiding hole. The limiting ring is disposed at one end of the base body away from the opening and provided with an inner flange. The end cap is disposed at one end of the limiting ring. Further, the second stem member has an outer flange abutted with the second stressed portion. When the valve stem is located at the close position, the outer flange of the second stem member is engaged with the inner flange of the limiting ring for ensuring the second inner oil guiding hole of the valve stem and the second outer oil guiding hole of the valve base not to communicate with each other. When the valve stem is located at the open position, the outer flange of the second stem member is disengaged from the inner flange of the limiting ring, such that the oil guiding channel is formed between the second stem member and the limiting ring.

Preferably, a sealing unit is provided between the valve base and the valve stem. The sealing unit includes a first sealing ring, a second sealing ring, and a locating ring disposed between the first sealing ring and the second sealing ring. The first sealing ring is positioned between an inner shoulder portion of the base body and the locating ring, and has an inner ring surface thereof abutted against the first stressed portion of the first stem member. The second sealing ring is positioned between the limiting ring and the locating ring, and has an inner ring surface thereof abutted against the second stressed portion of the second stem member. The locating ring has a radial hole communicating with the second outer oil guiding hole of the valve base. When the valve stem is located at the open position, the radial hole of the locating ring communicates with the oil guiding channel. By this way, the sealing effect of the valve stem can be enhanced.

Other advantages and features of the present invention will be fully understood by reference to the following specification in conjunction with the accompanying drawings, in which like reference signs denote like components of structure.

DETAILED DESCRIPTION OF THE INVENTION

Figure 1:
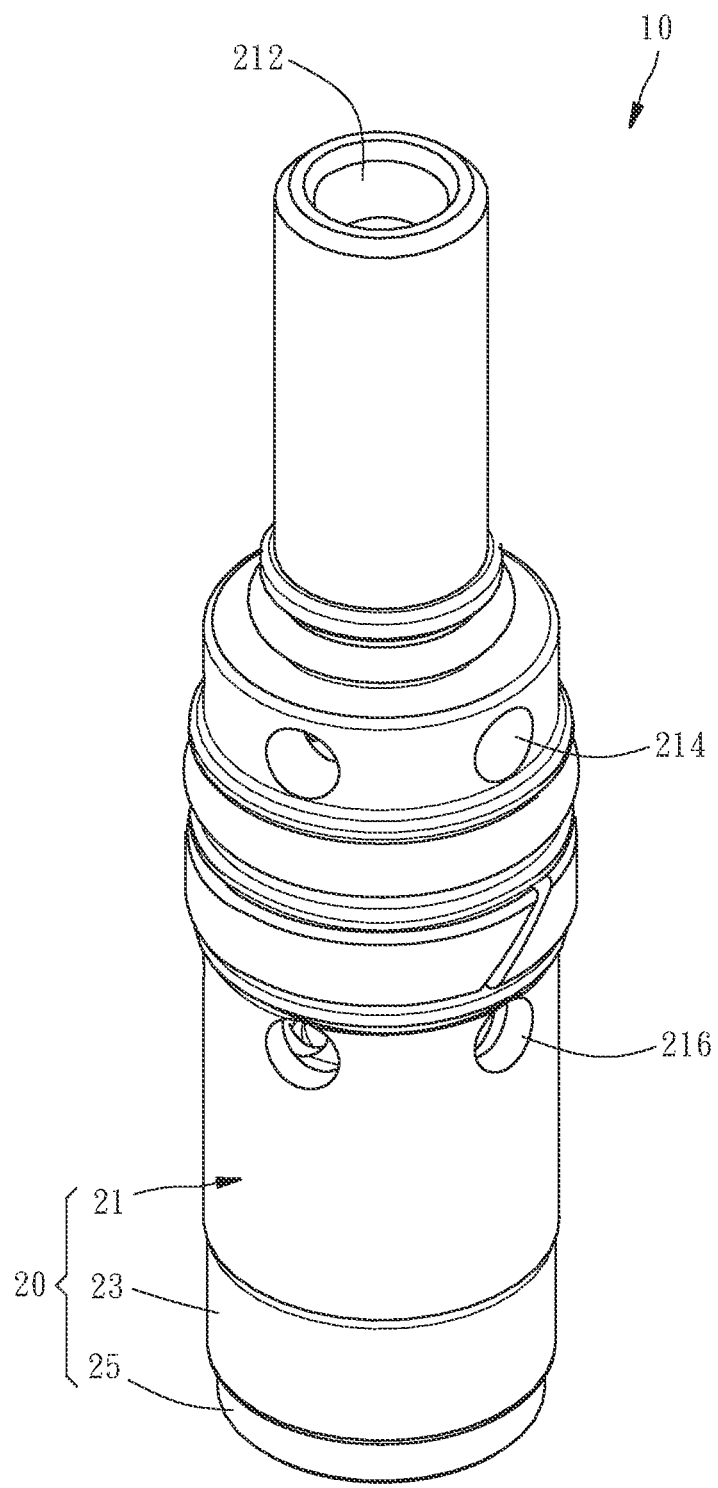
FIG. 1 is a perspective view of a pneumatic-hydraulic control valve of the present invention.
Figure 2:
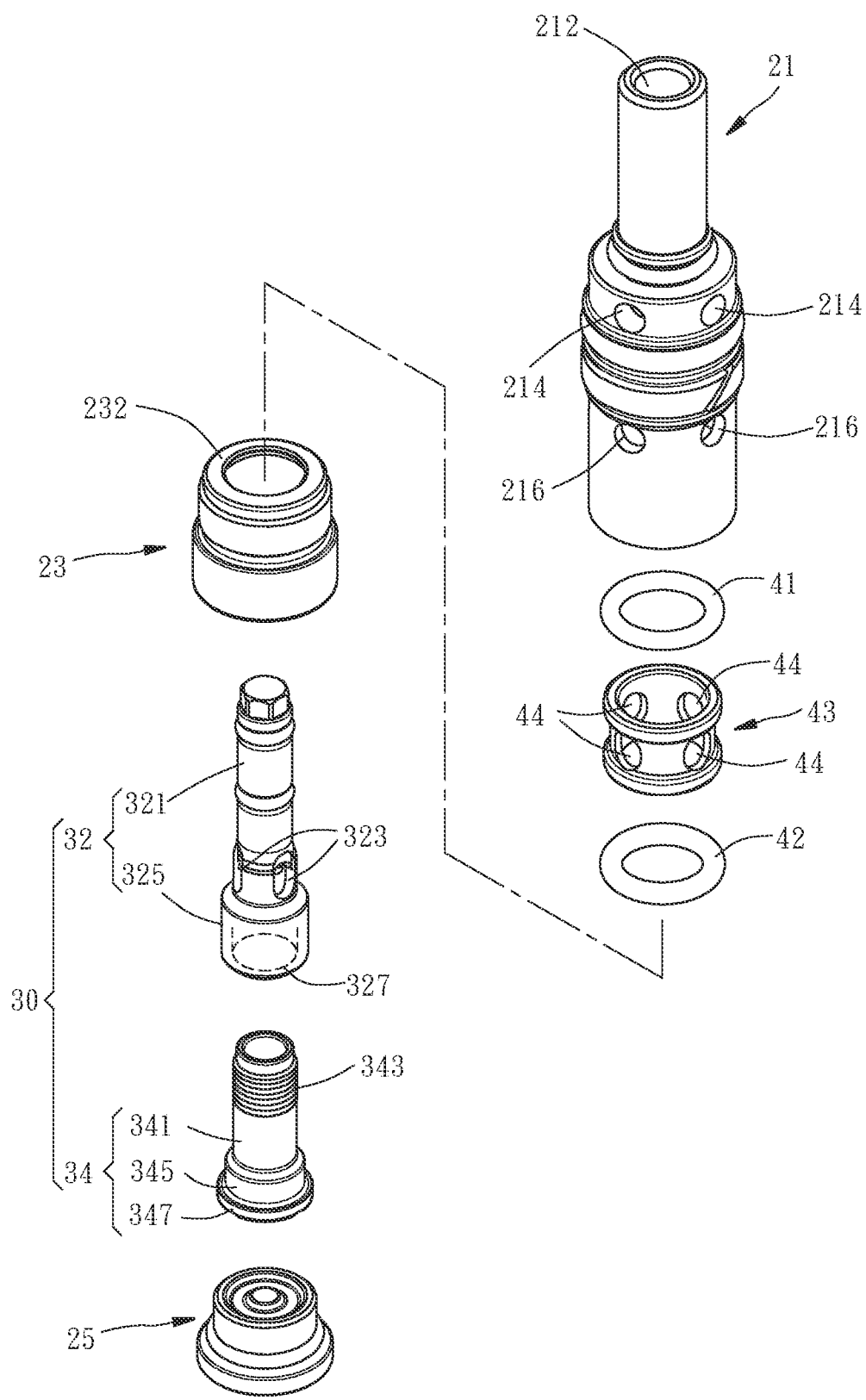
FIG. 2 is an exploded view of the pneumatic-hydraulic control valve of the present invention.

Referring to FIGS. 1 and 2, a pneumatic-hydraulic control valve 10 of the present invention comprises a valve base 20 and a valve stem 30.

Figure 3:
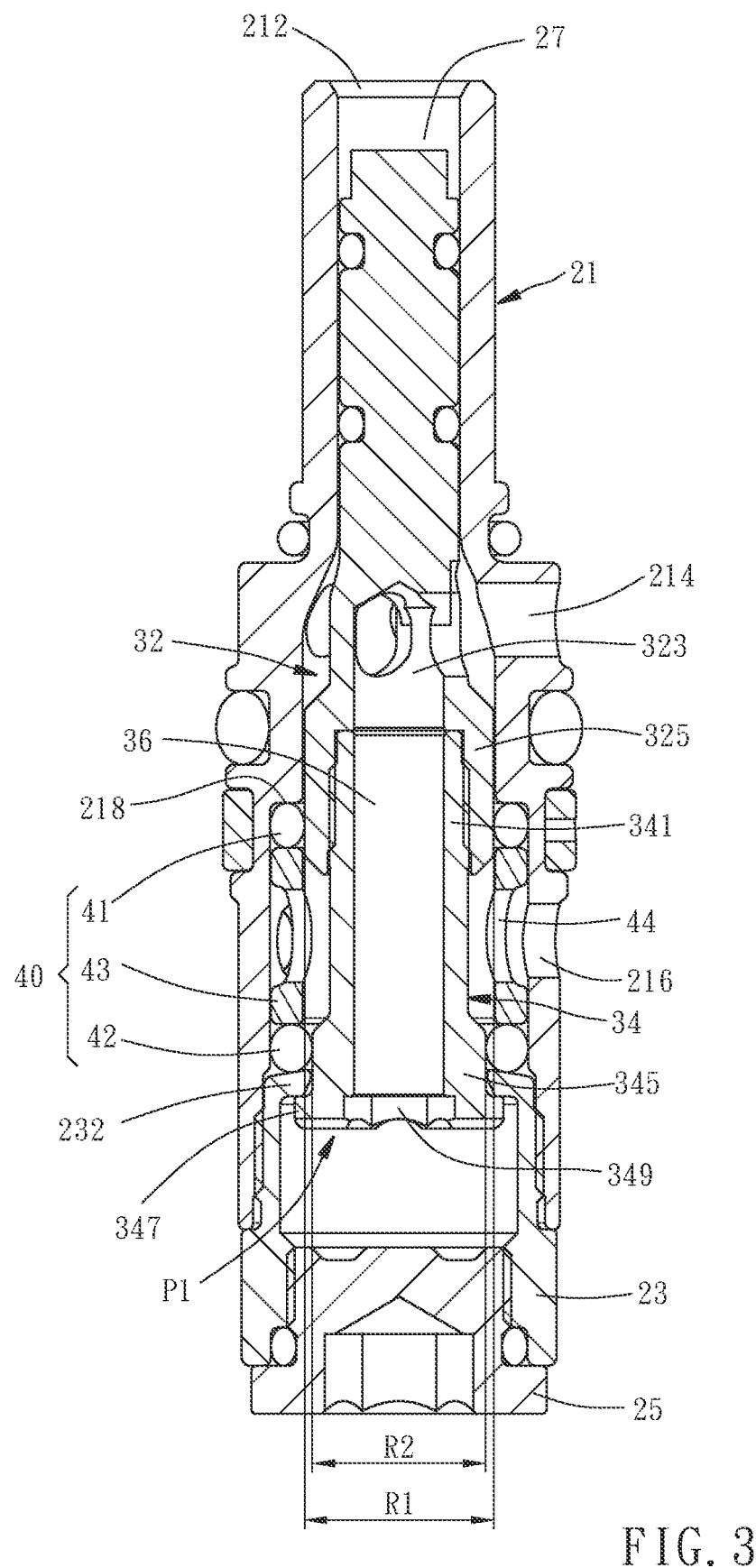
FIG. 3 is a sectional view of the pneumatic-hydraulic control valve of the present invention, showing the valve stem is located at the close position.

As shown in FIGS. 2 and 3, the valve base 20 includes a base body 21, a limiting ring 23, and an end cap 25. The base body 21 is hollow inside. The top end of the base body 21 has an opening 212, and the upper center of the base body 21 has four first outer oil guiding holes 214, and the lower center of the base body 21 has four second outer oil guiding holes 216, such that the distance between the first outer oil guiding holes 214 and the opening 212 is less than the distance between the second outer oil guiding holes 216 and the opening 212. The limiting ring 23 is threaded with the bottom end of the base body 21, and the top end of the limiting ring 23 has an inner flange 232 extending along a radial direction thereof. The end cap 25 is threaded with the bottom end of the limiting ring 23 to close the bottom end of the valve base 20. Thus, after the base body 21, the limiting ring 23, and the end cap 25 are assembled with each other, a valve hole 27 is formed inside the valve base 20. The valve hole 27 communicates axially with the opening 212 and communicates radially with the first outer oil guiding holes 214 and the second outer oil guiding holes 216.

As shown in FIGS. 2 and 3, the valve stem 30 includes a first stem member 32 and a second stem member 34. The first stem member 32 includes a first stem portion 321 provided with four straight first inner oil guiding holes 323, and a first stressed portion 325 connected with the first stem portion 321 and provided with an inner threaded hole 327 having an opening facing down and communicating with the first inner oil guiding holes 323. The second stem member 34 includes a second stem portion 341 having external threads 343 at its top end, a second stressed portion 345 connected with the second stem portion 341, and an outer flange 347 connected with the second stressed portion 345 and provided with a second inner oil guiding hole 349. Further, the second stem portion 341 and the second stressed portion 345 are penetrated by an inner oil groove 36. The bottom end of the inner oil groove 36 communicates with the second inner oil guiding hole 349. When the first stem member 32 and the second stem member 34 are assembled with each other, the second stem portion 341 of the second stem member 34 is threaded with the first stressed portion 325 of the first stem member 32 from down to top to enable the top end of the inner oil guiding groove 36 to communicate with the first inner oil guiding holes 323.

Figure 4:
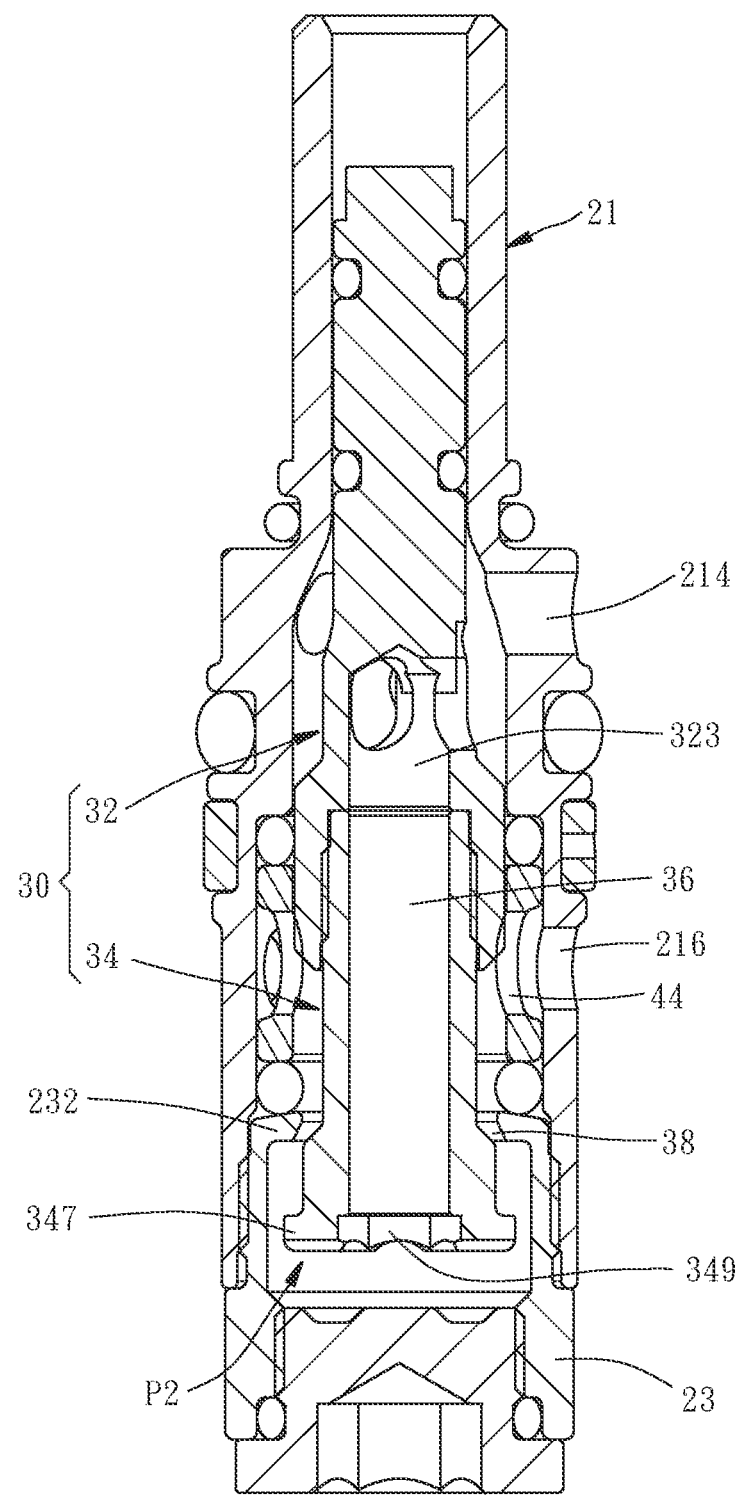
FIG. 4 is similar to FIG. 3, showing the valve stem is located at the open position.

As shown in FIGS. 3 and 4, the valve stem 30 is disposed in the valve hole 27 of the valve base 20 and movable upwards and downwards relative to the valve base 20. The first inner valve holes 323 of the valve stem 30 communicate constantly with the first outer oil guiding holes 214 of the valve base 20. When the valve stem 30 is located at a close position P1 as shown in FIG. 3, the outer flange 347 of the second stem member 30 of the valve stem 30 and the inner flange 232 of the limiting ring 23 of the valve base 20 are engaged with each other, such that the second inner oil guiding hole 349 of the valve stem 30 does not communicate with the second outer oil guiding holes 216 of the valve base 20. When the valve stem 30 is located at an open position P2 as shown in FIG. 4, the outer flange 347 of the second stem member 30 of the valve stem 30 and the inner flange 232 of the limiting ring 23 of the valve base 20 are disengaged from each other, such that an oil guiding channel 38 is formed between the second stem member 34 of the valve stem 30 and the base body 21 of the valve base 20. The oil guiding channel 38 communicates with the second inner oil guiding hole 349 of the valve stem 30 and the second outer oil guiding holes 216 of the valve base 20.

Figure 6:
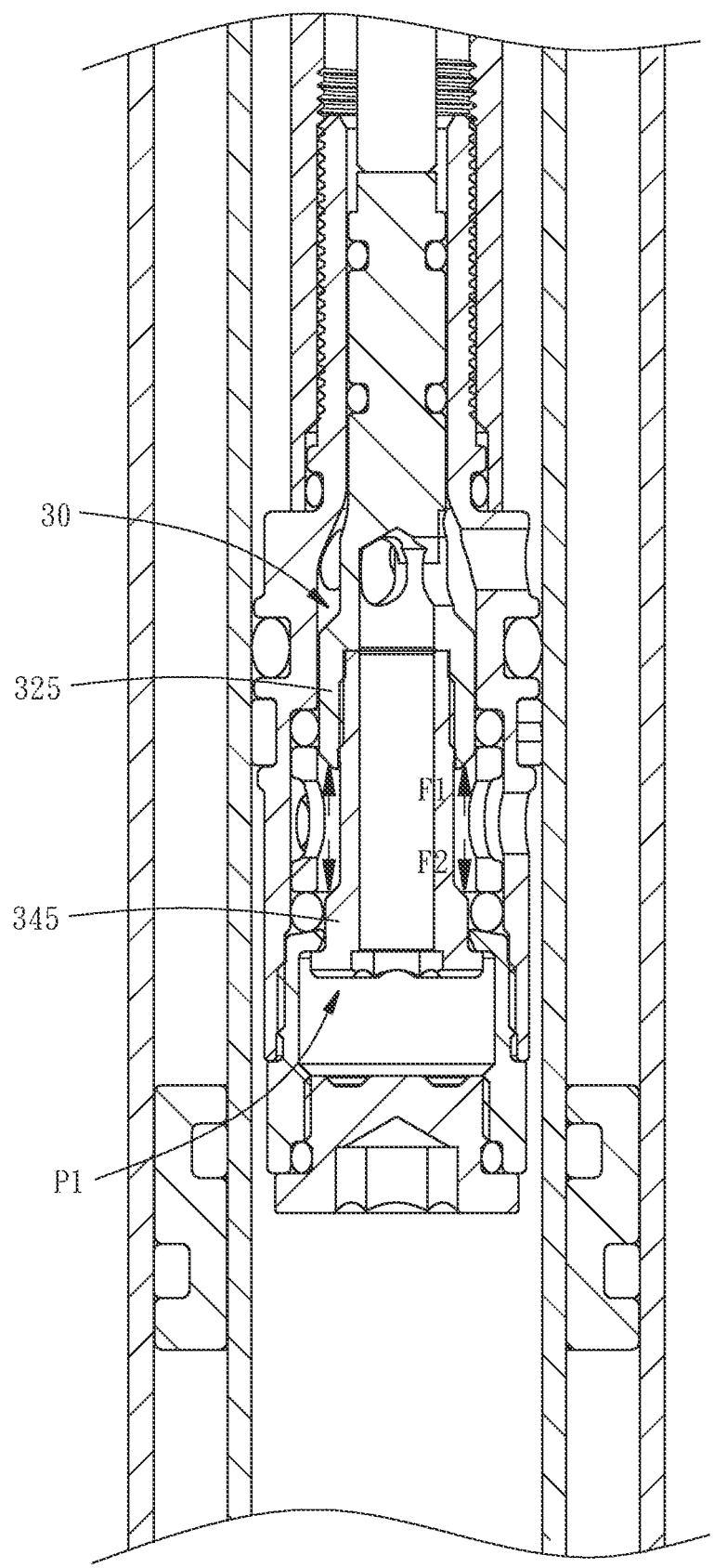
FIG. 6 is a partially enlarged view of FIG. 5.

Further, after the valve stem 30 is assembled with the valve base 20, as shown in FIG. 6, the first stressed portion 325 of the valve stem 30 is used to bear a fluid closing force F1, and the second stressed portion 345 of the valve stem 30 is used to bear a fluid opening force F2. Because the outer diameter R1 of the first stressed portion 325 is greater than the outer diameter R2 of the second stressed portion 345, the fluid closing force F1 acting on the valve stem 30 is greater than the fluid opening force F2 acting on the valve stem 30.

As shown in FIGS. 2 and 3, a sealing unit 40 is provided between the valve base 20 and the valve stem 30, including a first sealing ring 41, a second sealing ring 42, and a locating ring 43 for retaining the first sealing ring 41 and the second sealing ring 42. The first sealing ring 41 is positioned between an inner shoulder portion 218 of the base body 21 and the top end of the locating ring 43, and has an inner ring surface thereof abutted against the first stressed portion 325 of the first stem member 32. The second sealing ring 42 is positioned between the top end of the limiting ring 23 and the bottom end of the locating ring 43, and has an inner ring surface thereof abutted against the second stressed portion 345 of the second stem member 34. The locating ring 43 has four radial holes 44 communicating with the second outer oil guiding holes 216 of the valve base 20. When the valve stem 30 is located at the open position P2 as shown in FIG. 4, the radial holes 44 of the locating ring 43 communicate with the oil guiding channel 38.

Figure 5:
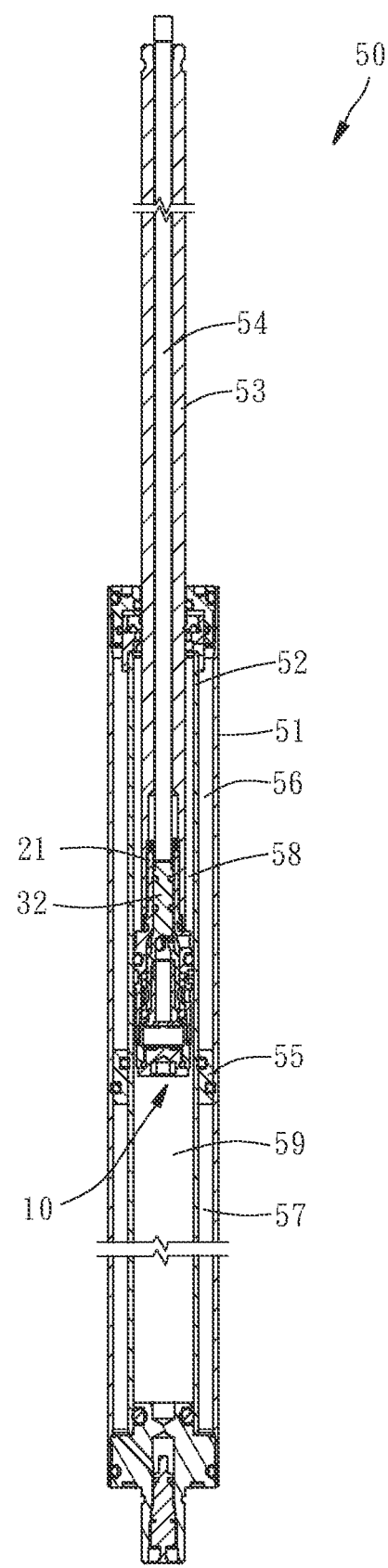
FIG. 5 is a sectional view of the pneumatic-hydraulic control valve of the present invention applied to a first type of a lifting seat tube.

In actual application, the pneumatic-hydraulic control valve 10 of the present invention can be used with different types of lifting seat tube. As shown in FIG. 5, FIG. shows a lifting seat tube 50 with a double tube design. The lifting seat tube 50 comprises an outer tube 51, an inner tube 52, a seat post 53, and a push rod 54. The inner tube 52 is mounted in the outer tube 51, and a floating piston 55 is disposed between the outer tube 51 and the inner tube 52, such that an outer oil chamber 56 is formed between the inner tube 52 and the outer tube 51 and located above the floating piston 55, and an air chamber 57 is formed between the inner tube 52 and the outer tube 51 and located below the floating piston 55. The seat post 53 is penetrated in the inner tube 52 from top to down and has a bottom end thereof threaded with the base body 21 of the valve base 20 so as to form a first inner oil chamber 58 and a second inner oil chamber 59. The first inner oil chamber 58 and the second inner oil chamber 59 are separated by the pneumatic-hydraulic control valve 10 of the present invention. The push rod 54, which is used as a valve driving mechanism for driving the valve stem 30, is penetrated in the seat post 53 from top to down and has a bottom end thereof abutted against the top end of the first stem member 32 of the valve stem 30 through the opening 212.

Figure 7:
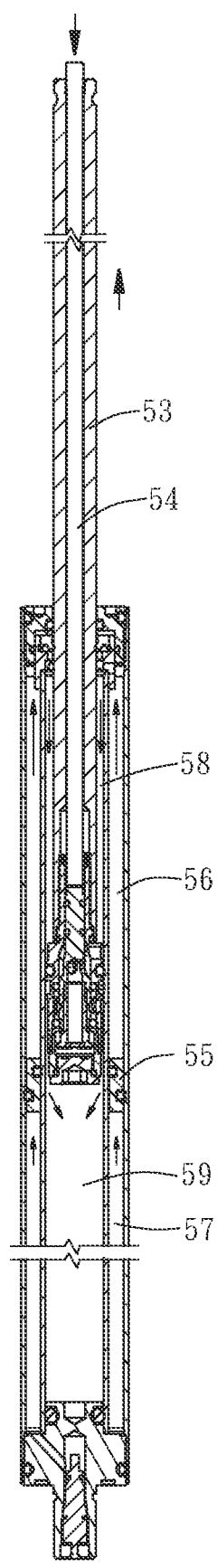
FIG. 7 is similar to FIG. 5, showing the seat post is raised.
Figure 8:
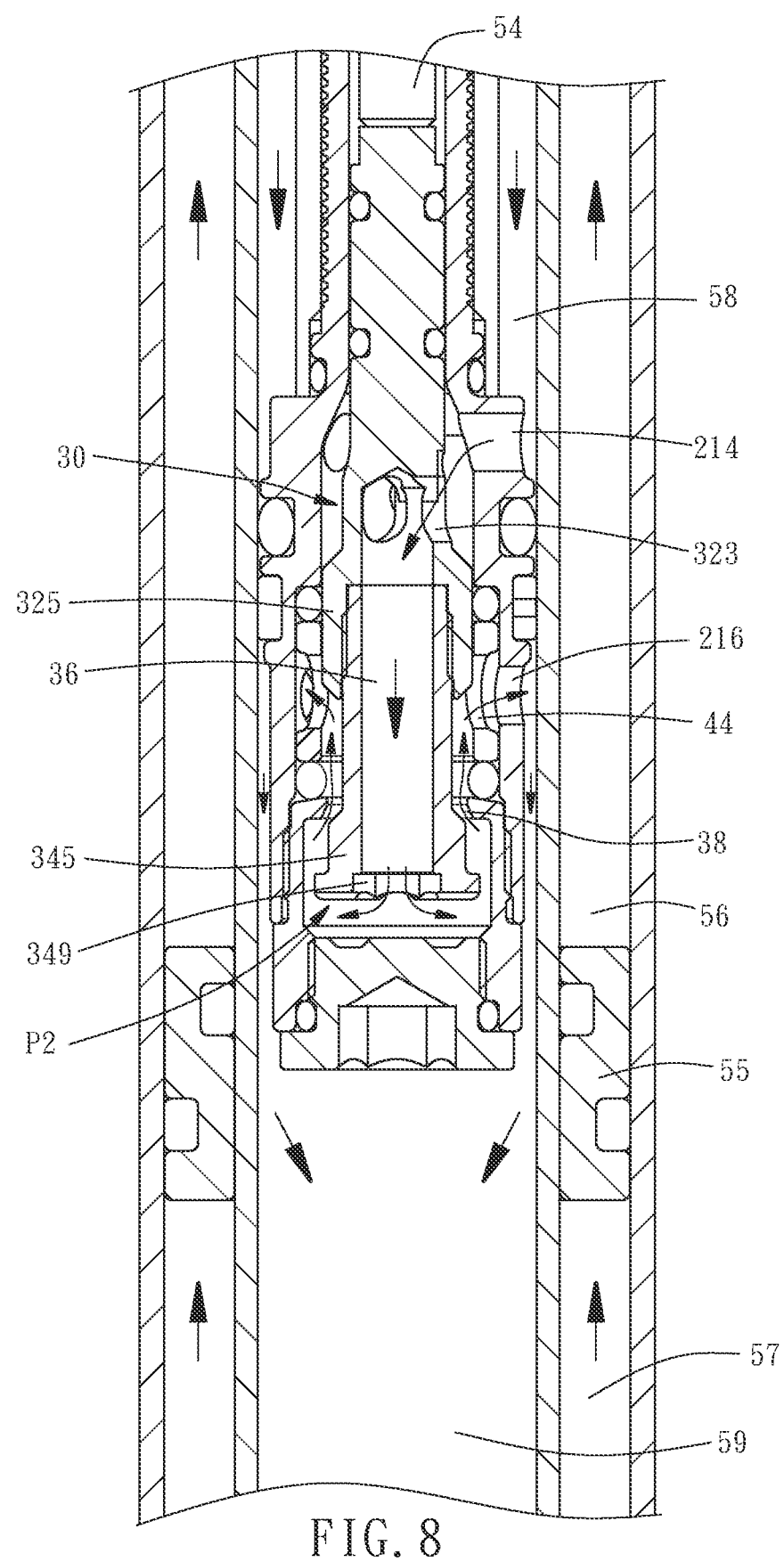
FIG. 8 is a partially enlarged view of FIG. 7.

Since the fluid closing force F1 is slightly greater than the fluid opening force F2, the valve stem 30 is maintained in the close position P1 as shown in FIG. 6 when a rider is not seated on a saddle. When the push rod 54 is driven to push the valve stem 30 downwards, as shown in FIG. 7, the resultant force acting on the valve stem 30 (i.e., the push force applied by the push rod 54 and the fluid opening force F2 acting on the second stressed portion 345) will overcome the fluid closing force F1 acting on the first stressed portion 325 to move the valve stem 30 to the open position P2 as shown in FIG. 8. At this time, the air in the air chamber 57 pushes the floating piston 55 upwards and then the floating piston 55 pushes the hydraulic oil in the outer oil chamber 56. Thereafter, the hydraulic oil flows from the outer oil chamber 56 to the first inner oil chamber 58 and then flows to the second inner oil chamber 59 through the first outer oil guiding holes 214, the first inner oil guiding holes 323, the inner oil guiding grove 36, the second inner oil guiding holes 349, the oil guiding channel 38, the radial holes 44, and the second outer oil guiding holes 216 in order. The seat post 53 will thus be raised (as shown in FIG. 6). When the driving force applied to the push rod 54 is eliminated, the valve stem 30 is pushed by the fluid closing force F1 acting on the first stressed portion 325 to move back to the close position P1 as shown in FIG. 6, such that the seat post 53 stops raising.

Figure 9:
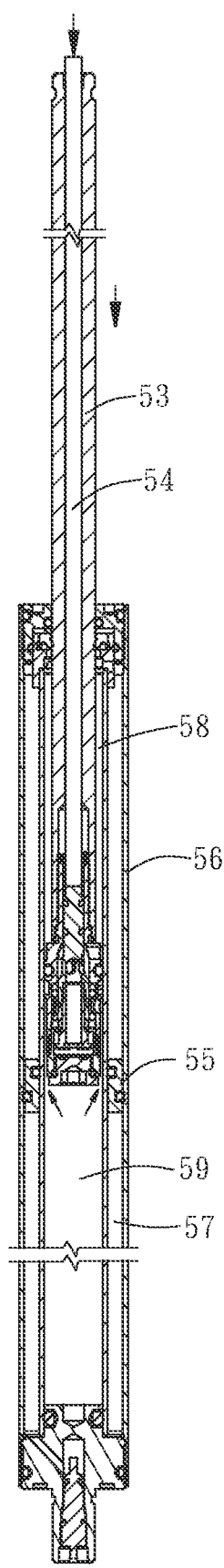
FIG. 9 is similar to FIG. 5, showing the seat post is lowered.
Figure 10:
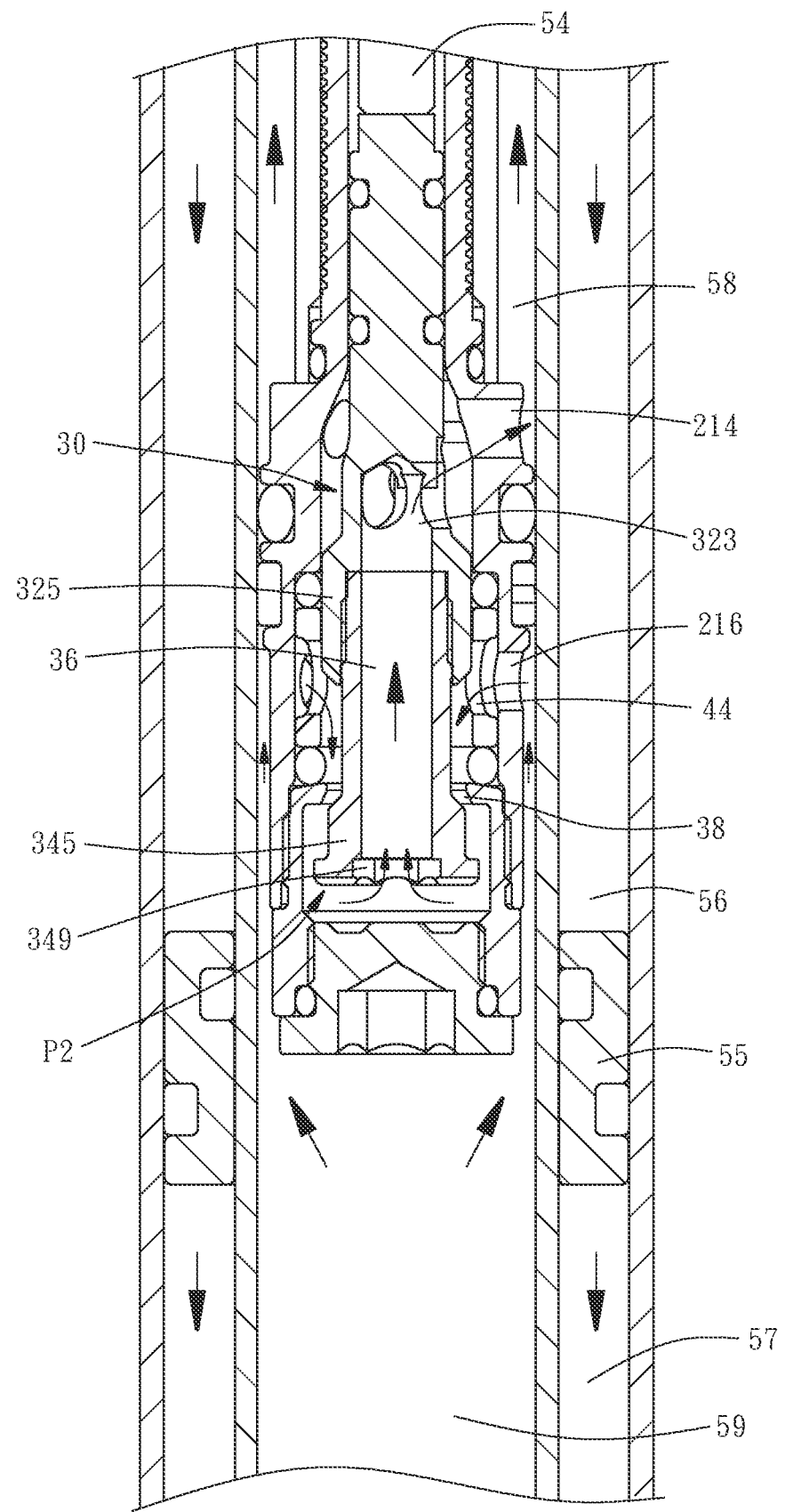
FIG. 10 is a partially enlarged view of FIG. 9.

On the contrary, when the rider is seated on the saddle, the fluid closing force F1 acting on the valve stem 30 is slightly increased. When the push rod 54 is driven to push the valve stem 30 downwards, as shown in FIG. 9, the resultant force acting on the valve stem 30 (i.e., the push force applied by the push rod 54 and the fluid opening force F2 acting on the second stressed portion 345) still will overcome the fluid closing force F1 acting on the first stressed portion 325 to move the valve stem 30 to the open position P2 as shown in FIG. 10. At this time, the hydraulic oil in the second inner oil chamber 59 flows to the first inner oil chamber 58 through the second outer oil guiding holes 216, the radial holes 44, the oil guiding channel 38, the second inner oil guiding holes 349, the inner oil guiding grove 36, the first inner oil guiding holes 323, and the first outer oil guiding holes 214 in order, and then the hydraulic oil flows from the first inner oil chamber 58 to the outer oil chamber 56 and pushes the floating piston 55 downwards to compress the air in the air chamber 57. The seat post 53 will thus be lowered. When the driving force applied to the push rod 54 is eliminated, the valve stem 30 is pushed by the fluid closing force F1 acting on the first stressed portion 325 to move back to the close position P1 as shown in FIG. 6, such that the seat post 53 stops lowering.

Figure 11:
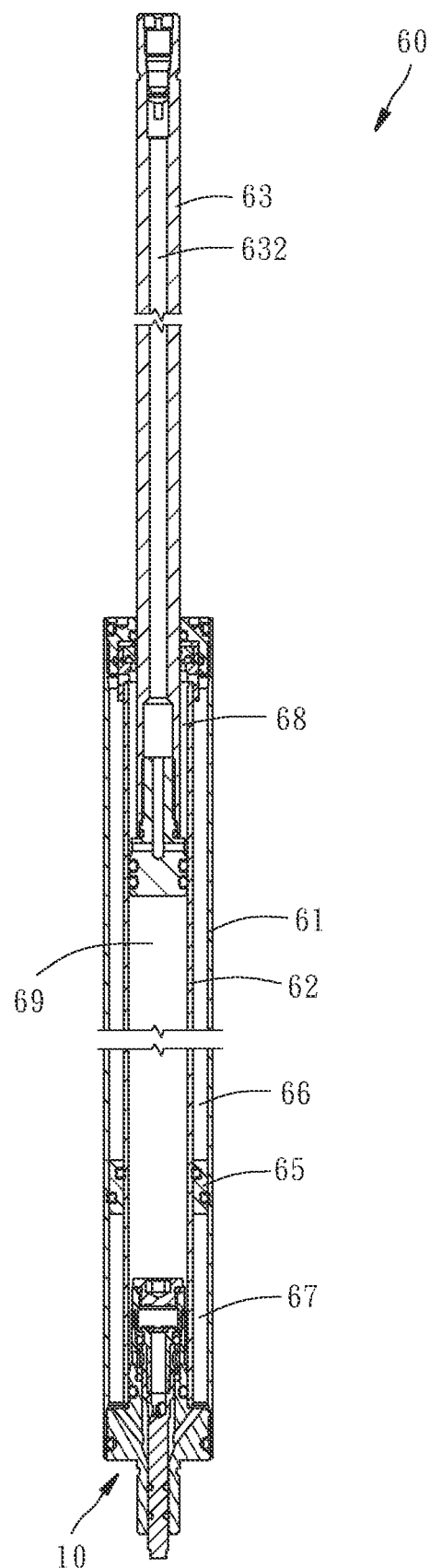
FIG. 11 is a sectional view of the pneumatic-hydraulic control valve of the present invention applied to a second type of the lifting seat tube.

As shown in FIG. 11, FIG. 11 shows another lifting seat tube 60 with a double tube design. The difference from the aforesaid lifting seat tube 50 is that the pneumatic-hydraulic control valve 10 is assembled with the bottom ends of the outer and inner tubes 61, 62 in an upside-down position, and the bottom end of the valve stem 30 protrudes out of the valve base 20 to provide the function of the push rod 54 provided by the aforesaid embodiment. Therefore, the push rod 54 can be omitted in this embodiment. Further, the lifting seat tube 60 comprises an outer tube 61, an inner tube 62, and a seat post 63. The inner tube 62 is mounted in the outer tube 61, and a floating piston 65 is disposed between the outer tube 61 and the inner tube 62, such that an outer air chamber 66 is formed between the outer tube 61 and the inner tube 62 and located above the floating piston 65, and an outer oil chamber 67 is formed between the outer tube 61 and the inner tube 62 and located below the floating piston 65. The seat post 63 is penetrated in the inner tube 62 from top to down to form an inner air chamber 68 and an inner oil chamber 69 located below the inner air chamber 68. The seat post 63 has an air channel 632 extending along an axial direction thereof and communicating with the inner air chamber 68.

Figure 12:
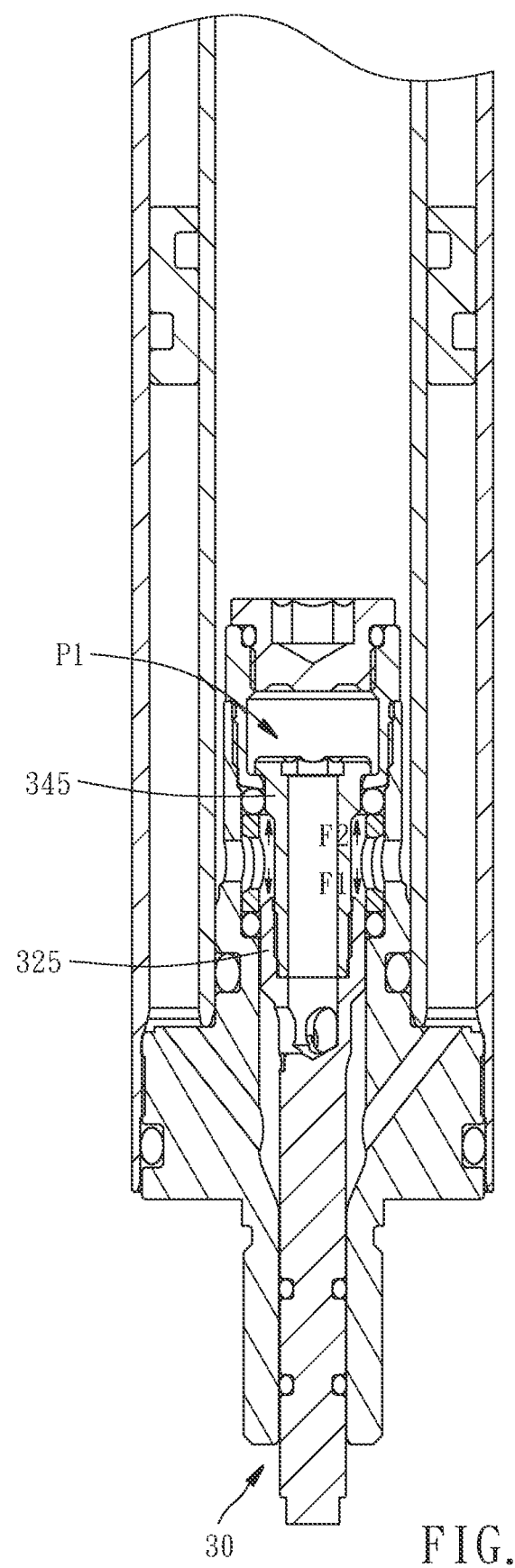
FIG. 12 is a partially enlarged view of FIG. 11.
Figure 13:
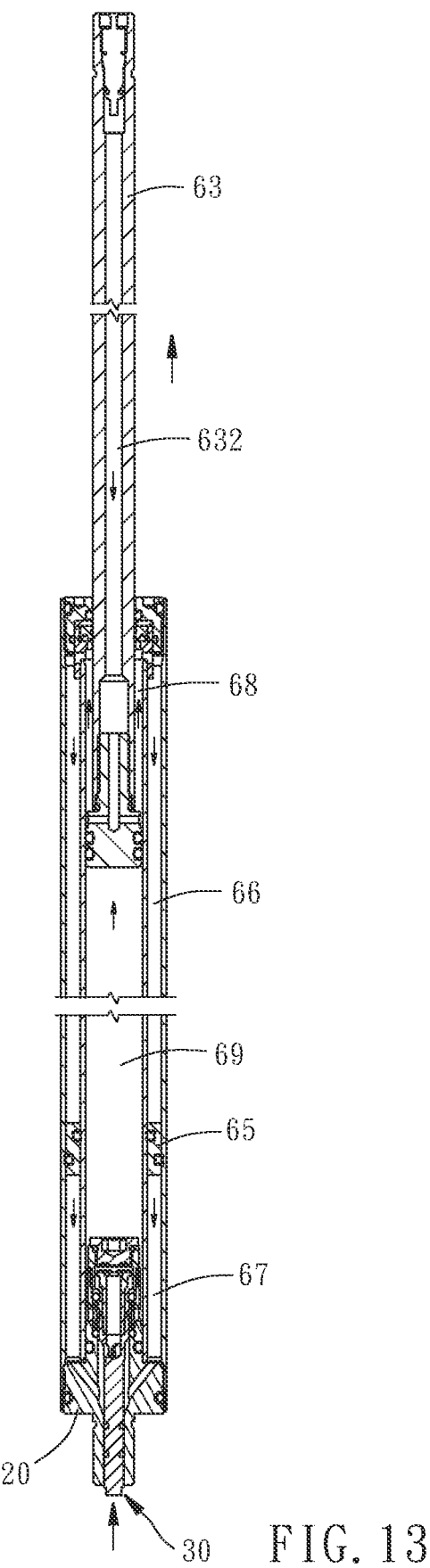
FIG. 13 is similar to FIG. 11, showing the seat post is raised.
Figure 14:
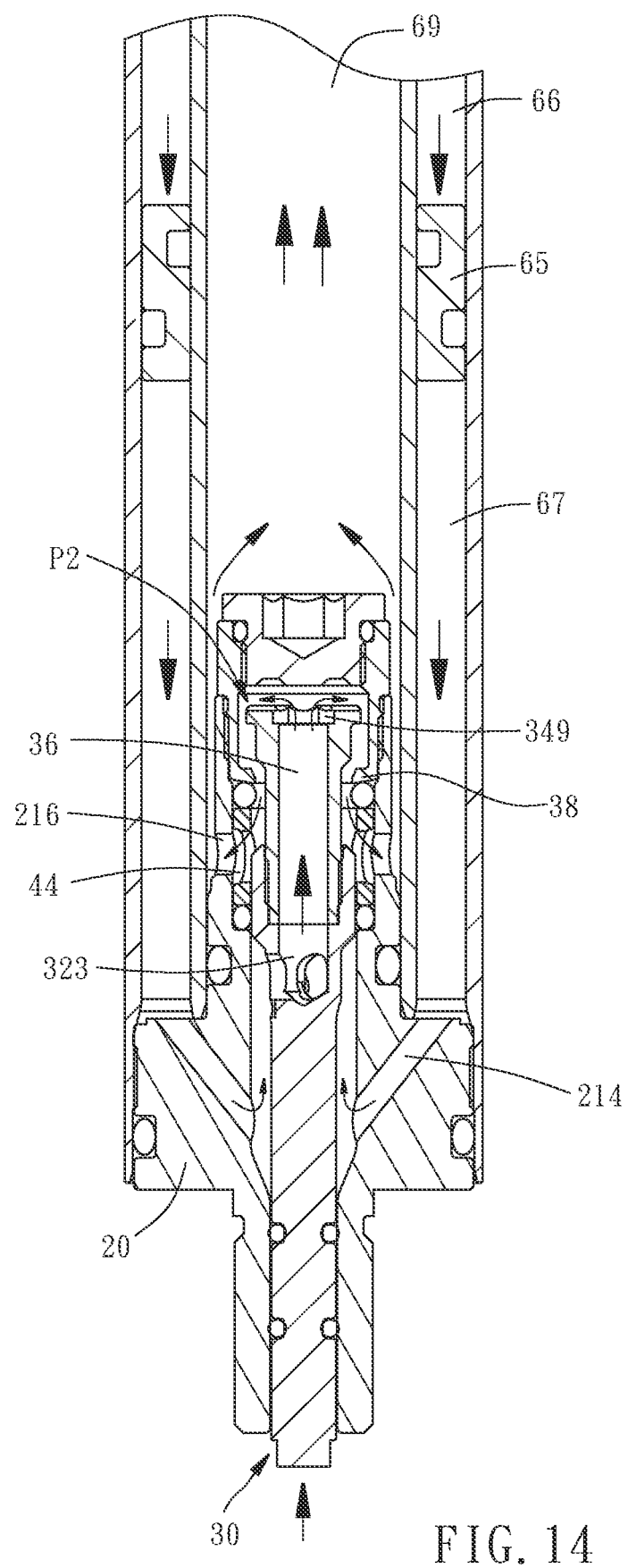
FIG. 14 is a partially enlarged view of FIG. 13.

Since the fluid closing force F1 is slightly greater than the fluid opening force F2, the valve stem 30 is maintained in the close position P1 as shown in FIG. 12 when the rider is not seated on a saddle. When the bottom end of the valve stem 30 is pushed upwards, as shown in FIG. 13, the resultant force acting on the valve stem 30 (i.e., the push force applied to the valve stem 30 and the fluid opening force F2 acting on the second stressed portion 345) will overcome the fluid closing force F1 acting on the first stressed portion 325 to move the valve stem 30 to the open position P2 as shown in FIG. 14. At this time, the air in the air channel 632 flows to the inner air chamber 68 first and then flows to the outer air chamber 66 and then pushes the floating piston 65 downwards to push the hydraulic oil in the outer oil chamber 67. Thereafter, the hydraulic oil flows from the outer oil chamber 67 to the inner oil chamber 69 through the first outer oil guiding holes 214, the first inner oil guiding holes 323, the inner oil guiding grove 36, the second inner oil guiding holes 349, the oil guiding channel 38, the radial holes 44, and the second outer oil guiding holes 216 in order. The seat post 63 will thus be raised. When the driving force applied to the valve stem 30 is eliminated, the valve stem 30 is pushed by the fluid closing force F1 acting on the first stressed portion 325 to move back to the close position P1 as shown in FIG. 12, such that the seat post 63 stops raising.

Figure 15:
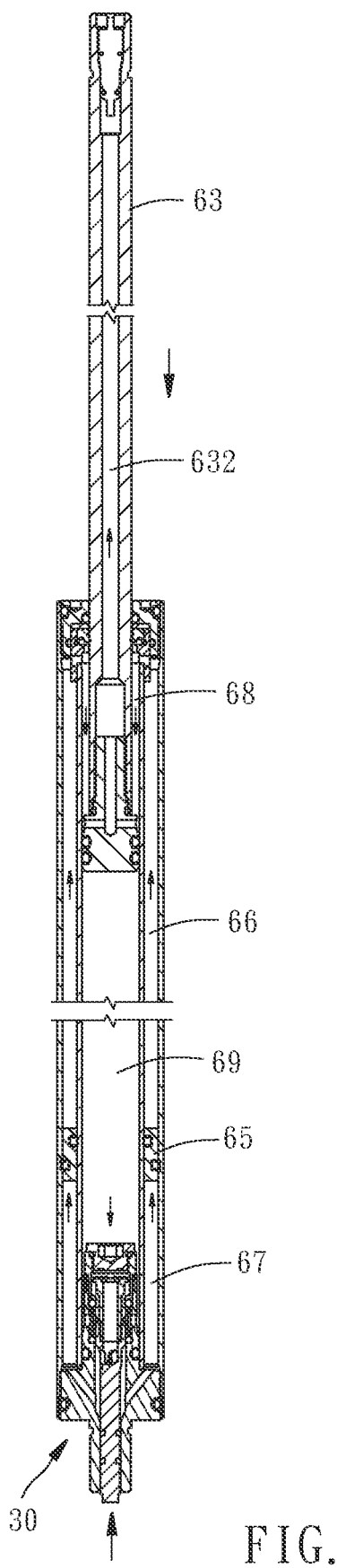
FIG. 15 is similar to FIG. 11, showing the seat post is lowered.
Figure 16:
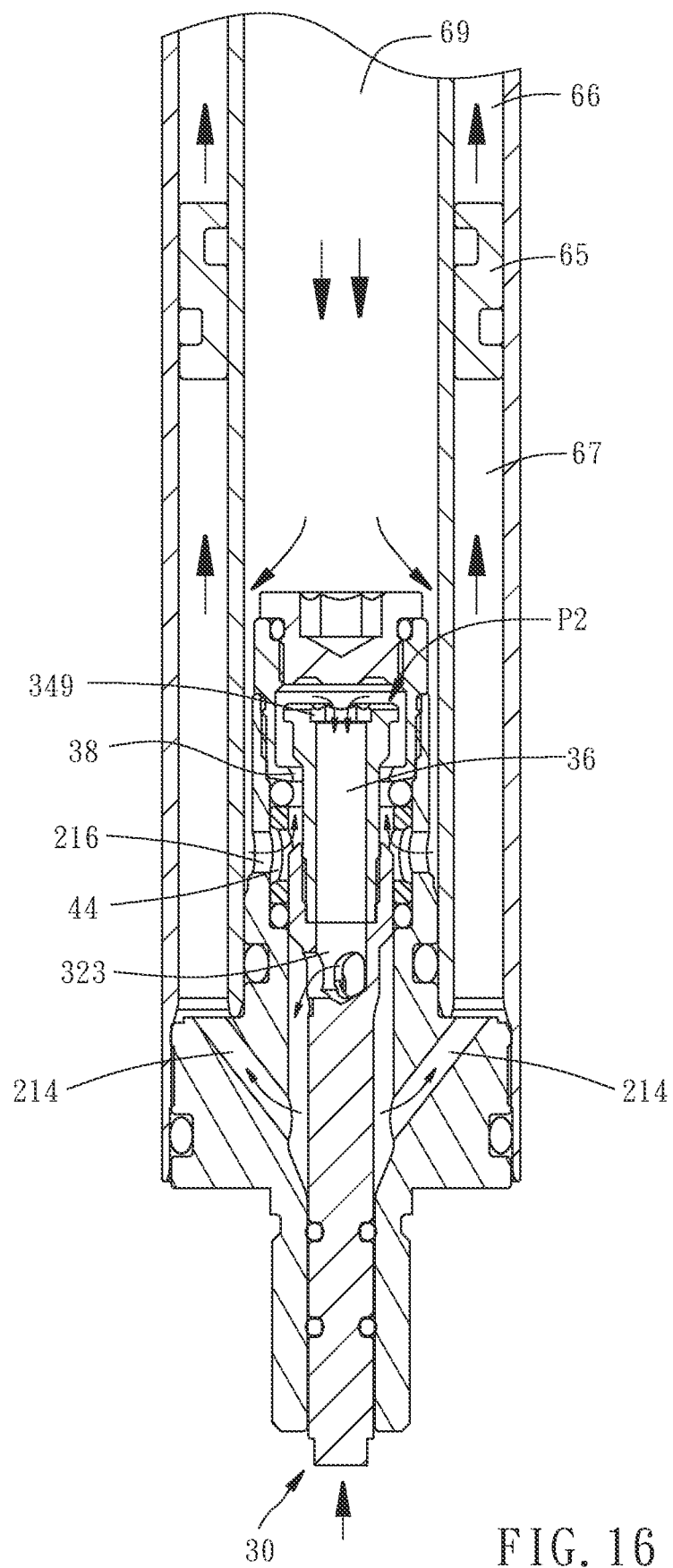
FIG. 16 is a partially enlarged view of FIG. 15.

On the contrary, when the rider is seated on the saddle, the fluid closing force F1 acting on the valve stem 30 is slightly increased. When the bottom end of the valve stem 30 is pushed upwards, as shown in FIG. 15, the resultant force acting on the valve stem 30 (i.e., the push force applied to the valve stem 30 and the fluid opening force F2 acting on the second stressed portion 345) still will overcome the fluid closing force F1 acting on the first stressed portion 325 to move the valve stem 30 to the open position P2 as shown in FIG. 16. At this time, the hydraulic oil in the inner oil chamber 69 flows to the outer oil chamber 67 through the second outer oil guiding holes 216, the radial holes 44, the oil guiding channel 38, the second inner oil guiding holes 349, the inner oil guiding grove 36, the first inner oil guiding holes 323, and the first outer oil guiding holes 214 in order. Thereafter, the floating piston 55 is pushed by the hydraulic oil to move upwards and push the air in the outer air chamber 66, such that the air in the outer air chamber 66 flows to the inner air chamber 68 first and then flows to the air channel 632. The seat post 63 will thus be lowered. When the driving force applied to the valve stem 30 is eliminated, the valve stem 30 is pushed by the fluid closing force F1 acting on the first stressed portion 325 to move back to the close position P1 as shown in FIG. 12, such that the seat post 63 stops lowering.

Figure 17:
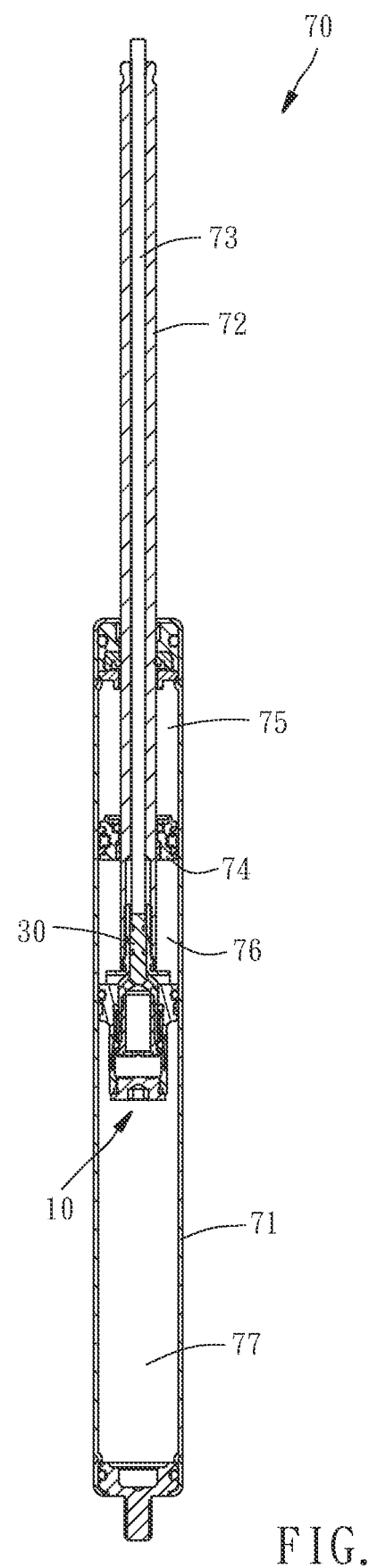
FIG. 17 is a sectional view of the pneumatic-hydraulic control valve of the present invention applied to a third type of the lifting seat tube.

As shown in FIG. 17, FIG. 17 shows a lifting seat tube 70 with a single tube design. The lifting seat tube 70 comprises an outer tube 71, a seat post 72, and a push rod 73. The seat post 72 is mounted in the outer tube 71 and has a bottom end thereof threaded with the base body 21 of the valve base 20. A floating piston 74 is disposed between the outer tube 71 and the valve base 20 to form an air chamber 75 located above the floating piston 74, an upper oil chamber 76 located below the floating piston 74, and a lower oil chamber 77 located below the valve base 20. The push rod 73, which is used as the valve driving mechanism for driving the valve stem 30, is penetrated in the seat post 73 from top to down and has a bottom end thereof abutted against the top end of the valve stem through the opening 212.

Figure 18:
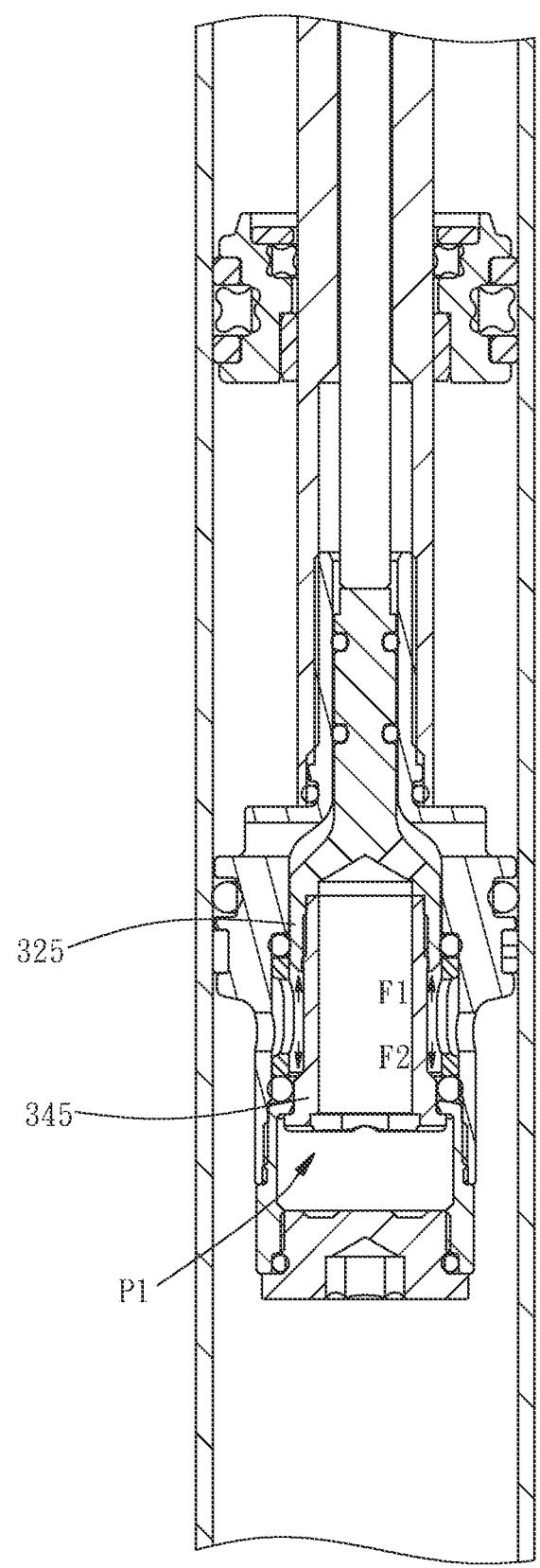
FIG. 18 is a partially enlarged view of FIG. 17.
Figure 19:
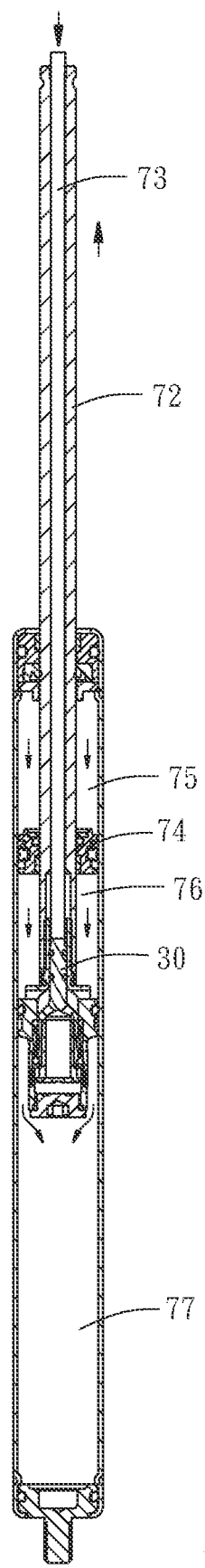
FIG. 19 is similar to FIG. 17, showing the seat post is raised.
Figure 20:
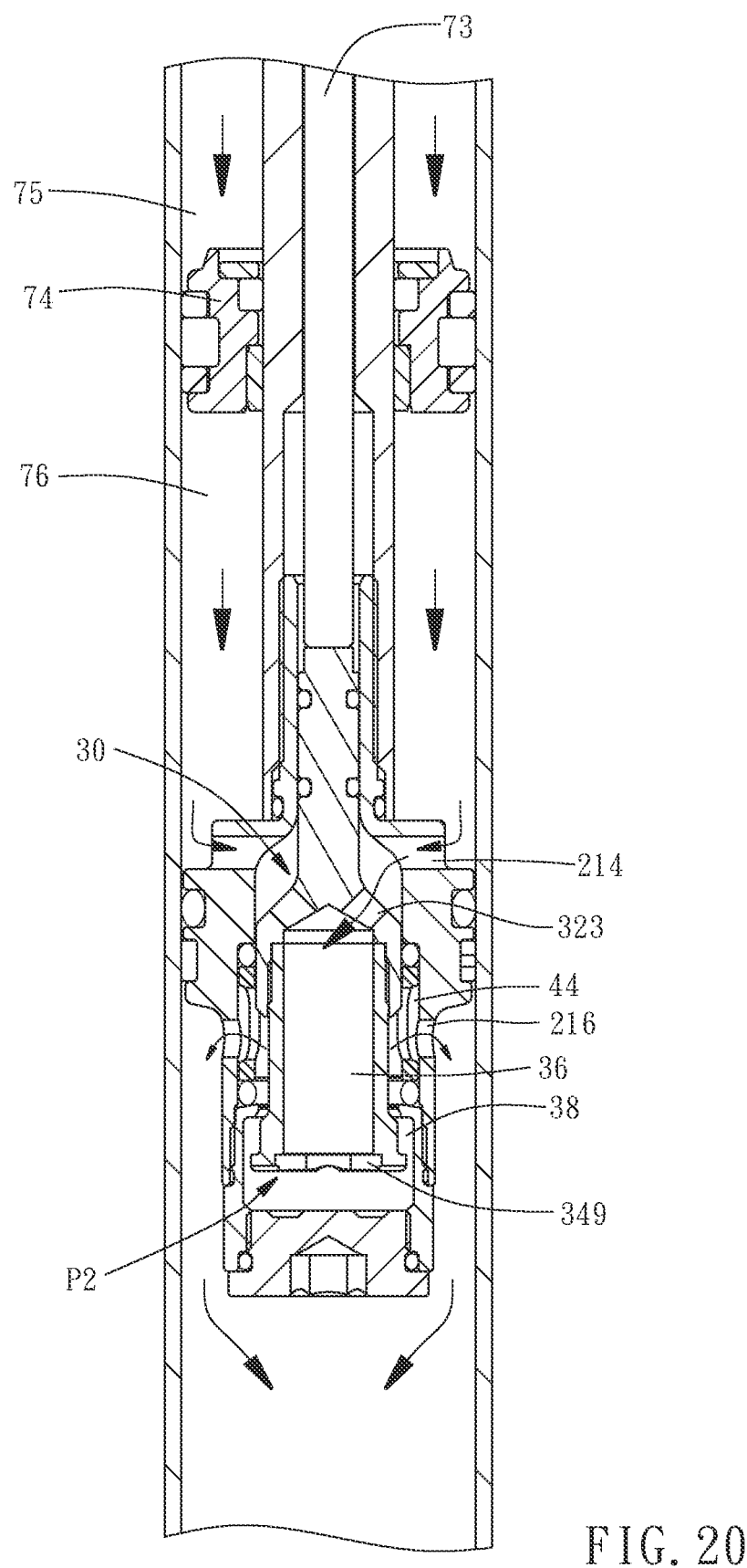
FIG. 20 is a partially enlarged view of FIG. 19.

Since the fluid closing force F1 is slightly greater than the fluid opening force F2, the valve stem 30 is maintained in the close position P1 as shown in FIG. 18 when the rider is not seated on the saddle. When the push rod 73 is driven to push the valve stem 30 downwards, as shown in FIG. 19, the resultant force acting on the valve stem 30 (i.e., the push force applied by the push rod 73 and the fluid opening force F2 acting on the second stressed portion 345) will overcome the fluid closing force F1 acting on the first stressed portion 325 to move the valve stem 30 to the open position P2 as shown in FIG. 20. At this time, the air in the air chamber 75 pushes the floating piston 74 downwards and then the floating piston 74 pushes the hydraulic oil in the upper oil chamber 76. The hydraulic oil flows from the upper oil chamber 76 to the lower oil chamber 77 through the first outer oil guiding holes 214, the first inner oil guiding holes 323, the inner oil guiding grove 36, the second inner oil guiding holes 349, the oil guiding channel 38, the radial holes 44, and the second outer oil guiding holes 216 in order. The seat post 72 will thus be raised. When the driving force applied to the push rod 73 is eliminated, the valve stem 30 is pushed by the fluid closing force F1 acting on the first stressed portion 325 to move back to the close position P1 as shown in FIG. 18, such that the seat post 72 stops raising.

Figure 21:
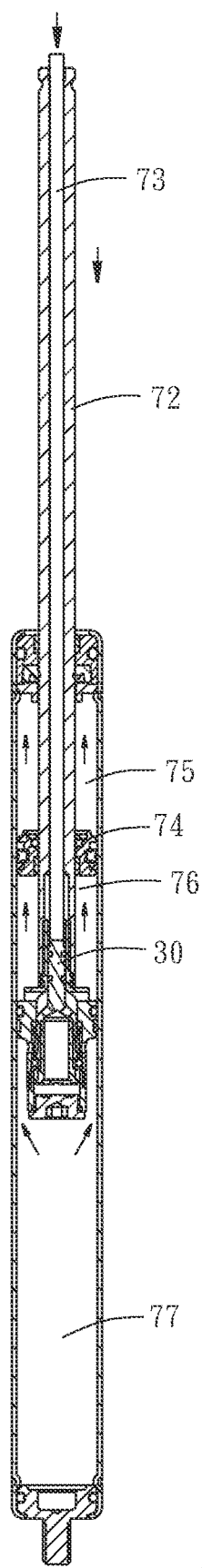
FIG. 21 is similar to FIG. 17, showing the seat post is lowered.
Figure 22:
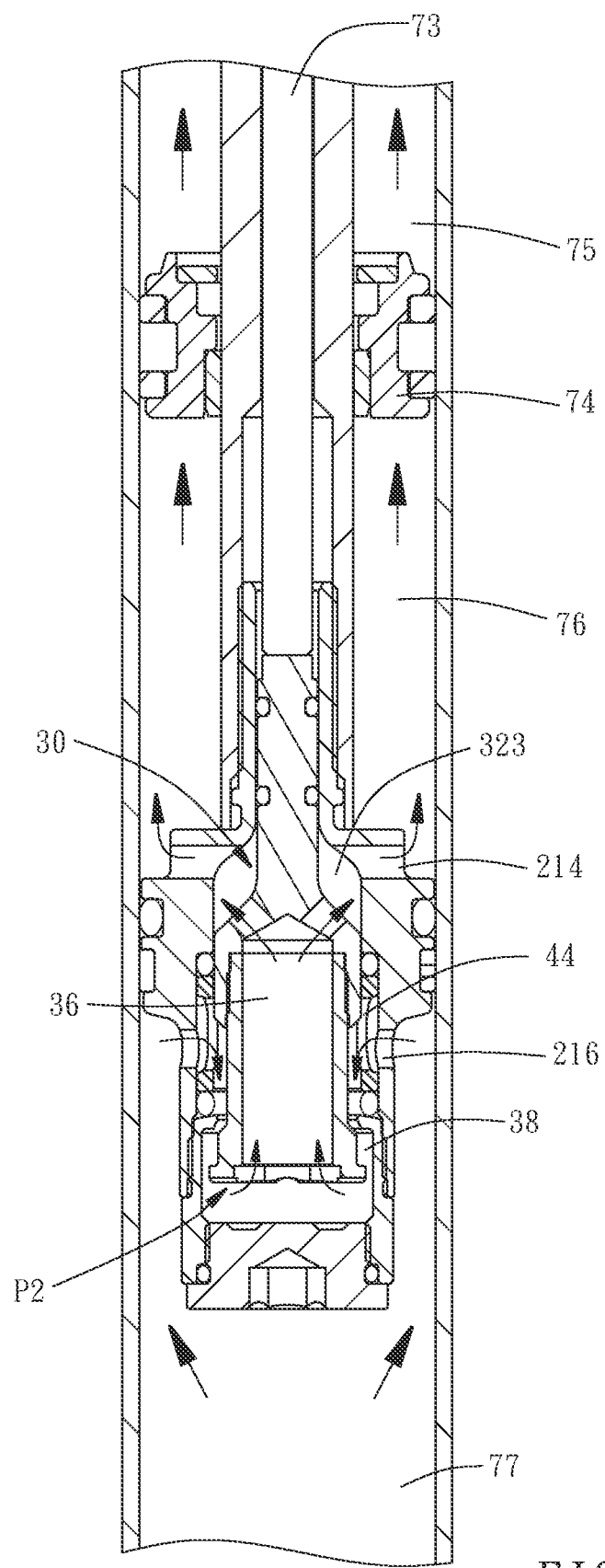
FIG. 22 is a partially enlarged view of FIG. 21.

On the contrary, when the rider is seated on the saddle, the fluid closing force F1 acting on the valve stem 30 is slightly increased. When the push rod 73 is driven to push the valve stem 30 downwards, as shown in FIG. 21, the resultant force acting on the valve stem 30 (i.e., the push force applied by the push rod 73 and the fluid opening force F2 acting on the second stressed portion 345) still will overcome the fluid closing force F1 acting on the first stressed portion 325 to move the valve stem 30 to the open position P2 as shown in FIG. 22. At this time, the hydraulic oil in the lower oil chamber 77 flows to the upper oil chamber 76 through the second outer oil guiding holes 216, the radial holes 44, the oil guiding channel 38, the second inner oil guiding holes 349, the inner oil guiding grove 36, the first inner oil guiding holes 323, and the first outer oil guiding holes 214 in order. Thereafter, the hydraulic oil pushes the floating piston 74 upwards to push the air in the air chamber 75. The seat post 72 will thus be lowered. When the driving force applied to the push rod 73 is eliminated, the valve stem 30 is pushed by the fluid closing force F1 acting on the first stressed portion 325 to move back to the close position P1 as shown in FIG. 18, such that the seat post 72 stops lowering.

As indicated above, the pneumatic-hydraulic control valve 10 of the present invention utilizes the difference in the outer diameter between the first stressed portion 325 and the second stressed portion 345 to enable the fluid closing force F1 to be slightly greater than the fluid opening force F2 when the valve stem 30 is closed, thereby ensuring the sealing effect of the valve stem 30. On the other hand, when the weight of the rider is added to the valve stem 30, the fluid closing force F1 is slightly increased but not much, so the force required to open the valve stem 30 is not limited by the weight of the rider. Therefore, a mechanism with less valve opening force (such as a motor) can be configured to the valve stem 30, and certainly, a mechanism with greater valve opening force (such as a push-pull cable) can be configured to the valve stem 30, such that the pneumatic-hydraulic control valve 10 of the present invention can be applied to various types of the pneumatic-hydraulic actuating device (such as the aforesaid lifting seat tube or a front fork).

Although particular embodiments of the invention have been described in detail for purposes of illustration, various modifications and enhancements may be made without departing from the spirit and scope of the invention. Accordingly, the invention is not to be limited except as by the appended claims.

What is claimed is:

1. A pneumatic-hydraulic control valve comprising:
   a valve base having a valve hole, a first outer oil guiding hole radially communicating with the valve hole, and a second outer oil guiding hole radially communicating with the valve hole;
   a valve stem movably disposed in the valve hole of the valve base and having a first inner oil guiding hole communicating with the first outer oil guiding hole of the valve base, a second inner oil guiding hole, and an inner oil guiding groove communicating with the first inner oil guiding hole and the second inner oil guiding hole, the valve stem being axially moveable relative to the valve base between a close position where the second inner oil guiding hole of the valve stem and the second outer oil guiding hole of the valve base do not communicate with each other, and an open position where an oil guide channel is formed between the valve base and the valve stem and communicates with the second inner oil guiding hole of the valve stem and the second outer oil guiding hole of the valve base, the valve stem having a first stressed portion adjacent to the first inner oil guiding hole for bearing a fluid closing force, and a second stressed portion adjacent to the second inner oil guiding hole for bearing a fluid opening force, an outer diameter of the first stressed portion being larger than an outer diameter of the second stressed portion.

2. The pneumatic-hydraulic control valve as claimed in claim 1, wherein one end of the valve base has an opening axially communicating with the valve hole; a distance between the first outer oil guiding hole and the opening is less than a distance between the second outer oil guiding hole and the opening.

3. The pneumatic-hydraulic control valve as claimed in claim 2, wherein a valve driving mechanism is installed in the opening for driving the valve stem to move between the close position and the open position.

4. The pneumatic-hydraulic control valve as claimed in claim 1, wherein the valve stem includes a first stem member provided with the first inner oil guiding hole, and a second stem member provided with the inner oil guiding groove; one end of the first stem member is adjacent to the opening of the valve base, and the other end of the first stem member has the first stressed portion; one end of the second stem member is threaded with the first stressed portion of the first stem member, and the other end of the second stem member has the second inner oil guiding hole and the second stressed portion the oil guiding channel is formed between the second stem member of the valve stem and the valve base when the valve stem is located at the open position.

5. The pneumatic-hydraulic control valve as claimed in claim 4, wherein the valve base includes a base body provided with the opening and the first outer oil guiding hole, a limiting ring disposed at one end of the base body away from the opening, and an end cap disposed at one end of the limiting ring; the second stem member has an outer flange adjacent to the second stressed portion, and the limiting rind has an inner flange engaged with the outer flange of the second stem member w % ben the valve stem is located at the close position, and disengaged from the outer flange of the second stem member when the valve stem is located at the open position.

6. The pneumatic-hydraulic control valve as claimed in claim 5, further comprising a sealing unit provided between the valve base and the valve stem; the sealing unit includes a first sealing ring, a second sealing ring, and a locating ring disposed between the first sealing ring and the second sealing ring; the first sealing ring is positioned between an inner shoulder portion of the base body and the locating ring, and has an inner ring surface thereof abutted against the first stressed portion of the first stem member; the second sealing ring is positioned between the limiting ring and the locating ring and has an inner ring surface thereof abutted against the second stressed portion of the second stem member; the locating ring has a radial hole communicating with the second outer oil guiding hole of the valve base and communicating with the oil guiding channel when the valve stem is located at the open position.

* * * * *